United States Patent [19]

Pierman

[11] Patent Number: 5,144,734

[45] Date of Patent: Sep. 8, 1992

[54] METHOD FOR MAKING A VEHICLE SUSPENSION MEMBER

[75] Inventor: Richard F. Pierman, Northville, Mich.

[73] Assignee: Eaton Corporation, Cleveland, Ohio

[21] Appl. No.: 666,968

[22] Filed: Mar. 11, 1991

[51] Int. Cl.$^5$ .............................................. B23P 13/00
[52] U.S. Cl. ........................................ 29/173; 267/47
[58] Field of Search .............. 29/173; 267/36.1, 44, 267/47, 158, 164

[56] References Cited

U.S. PATENT DOCUMENTS

| | | | |
|---|---|---|---|
| 1,204,037 | 11/1916 | Laher | 267/47 |
| 1,250,332 | 12/1917 | McCloud | 267/47 |
| 1,336,314 | 4/1920 | Nyquist | 267/47 |
| 3,204,944 | 9/1965 | Brownyer | 267/47 |

Primary Examiner—P. W. Echols
Attorney, Agent, or Firm—A. E. Chrow

[57] ABSTRACT

A vehicle suspension member such as a spring leaf or plate (50) is provided with at least one discontinuity therein that extends generally parallel to a longitudinal axis ("L/A") extending therealong between opposite ends thereof and is effective to divert crack propagation in a direction generally parallel thereto. The discontinuity(s) are provided by methods that include compressing an elongate member (10,12) having enclosed voids (12,16) extending along its central region in one embodiment or by compressing an elongate member (26) having a plurality of enclosed voids (28) extending along its length in another embodiment or by compressing an elongate member (41) having opposite sides (43,43') that, in cross-section, have a concave shape, in yet another embodiment.

8 Claims, 3 Drawing Sheets

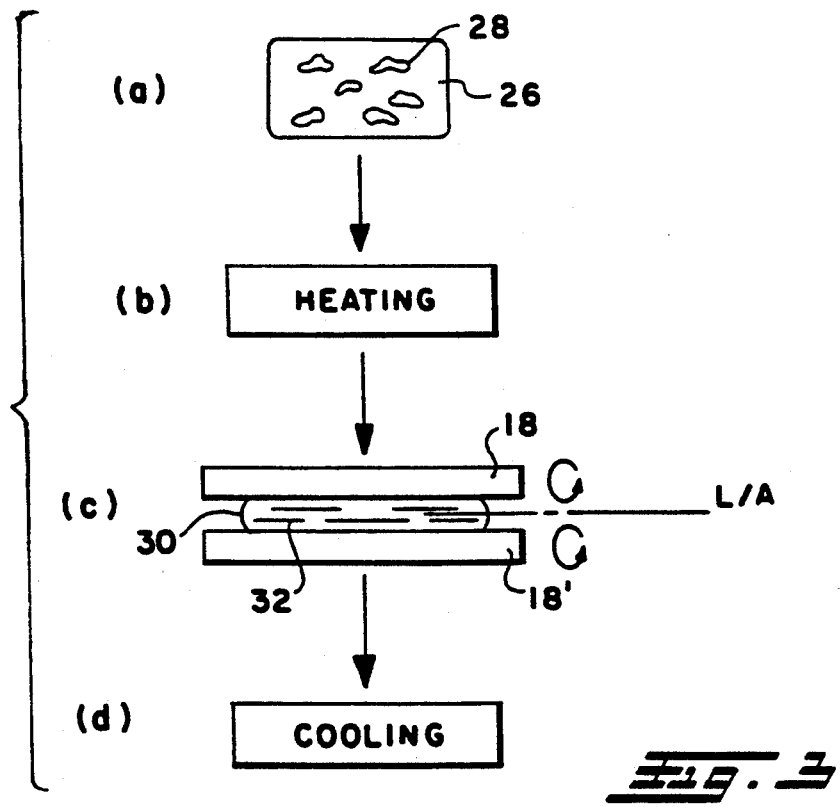
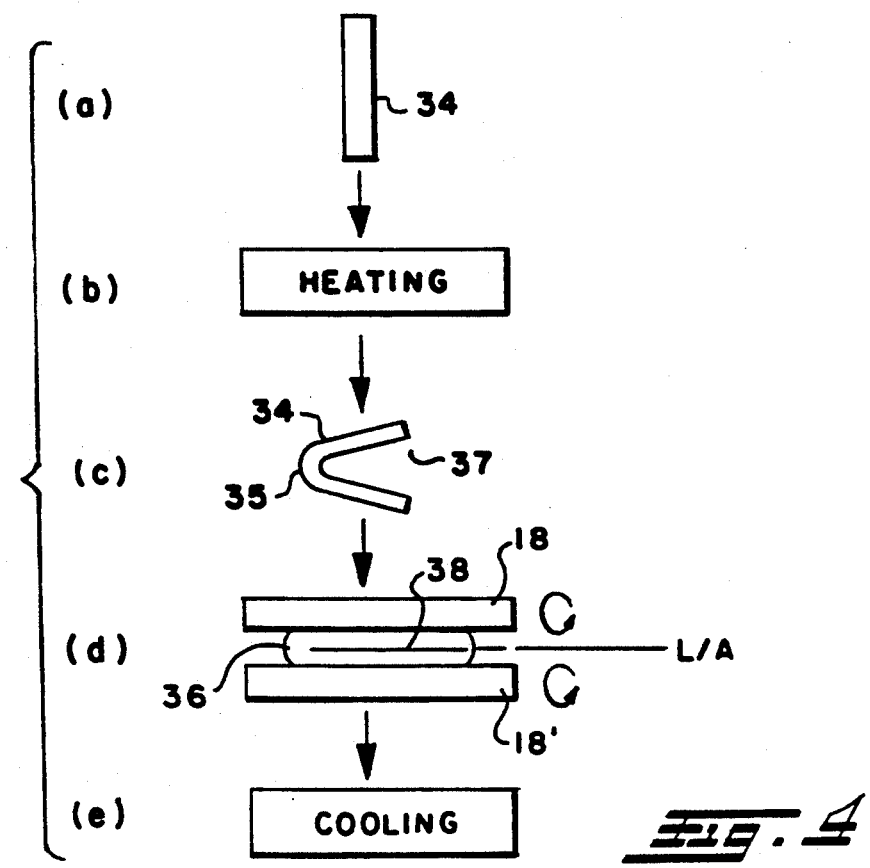

METHOD FOR MAKING A VEHICLE SUSPENSION MEMBER

INTRODUCTION

This invention relates generally to a vehicle suspension member and method for making same exemplary of which is a leaf spring comprising a singular or plurality of leafs or plates of which at least one has at least one discontinuity therewithin that is substantially parallel to the longitudinal axis extending between opposite ends thereof and effective to redirect or divert crack propagation in a direction generally parallel thereto.

BACKGROUND OF THE INVENTION

Although coil springs have recently come into favor for passenger car suspension systems, leaf springs remain in favor for use particularly in truck suspension systems and are likely to for many years to come because of the load capacity, packaging and axle location advantages associated therewith. Although described herein with particularity to leaf springs, the present invention includes any vehicle suspension member subject to torsional or bending loads and having a longitudinal axis extending between opposite ends such as torque rods (also called trailing arms) for axle control; traction bars (keep axle from twisting during braking); and track rods (keep axle from shifting laterally).

Leaf springs generally comprise a singular leaf or plate or a plurality of leafs or plates of substantially constant or tapered thickness most commonly made from steel and secured together and operative to support the frame of the vehicle on the wheel axle. As might be expected, the number of leafs or plates employed in the leaf spring is based on allowable design stress for a given load capacity and deflection range.

Each plate of a leaf spring is subjected to cantilever bending producing a (positive) tensile stress on the upper, typically concave, surface of the leaf to which the vehicle load or force is applied. As a result, a balancing (negative) compressive stress is developed on the lower, typically convex, surface of the leaf. The tensile stress is a maximum at the upper surface of the leaf and decreases to zero at or near the center of the plate thickness also known as the neutral axis hereinafter referred to as the longitudinal axis extending between opposite ends of the plate or leaf. Similarly, the balancing compressive stress is a maximum on the lower surface declining to zero at the longitudinal axis. Virtually all cracks are initiated at or near the upper surface of the leaf spring plate at the point of maximum tensile stress.

Due to high strength requirements, leaf springs must have high hardness which causes them to be prone to rapid crack propagation through the leaf cross-section once a relatively shallow crack is developed at the tensile surface. The incidence of crack initiation and progression is generally a function of increased service life or time and also service conditions including load history and corrosion. No matter how a crack may develop, i.e., fatigue and/or corrosion, its progression beyond a critical depth of generally less than one-half of section thickness is rapid to complete fracture or separation. The present invention provides a means of diverting crack propagation which initiates at or near the upper tensile surface and progresses through the thickness of the leaf or plate in a direction generally perpendicular to the longitudinal axis of the leaf by redirecting crack progression to a direction generally parallel thereto. Effectively, the parallel crack or delamination of the flat (or tapered) plate section lowers section stiffness causing the spring to sag well before final fracture providing the user some early indication of impending spring failure prior to complete separation and possible vehicle debilitation.

SUMMARY OF THE INVENTION

Accordingly, it is an object of this invention to provide a vehicular suspension member such as a leaf spring comprised of at least one plate that is adapted to divert or redirect crack propagation in a direction generally parallel to a longitudinal axis extending between opposite ends thereof.

BRIEF DESCRIPTION OF THE DRAWINGS

FIG. 3 is a schematic block diagram of a method of making a plate or leaf from a billet having a plurality of voids or cavities 28;

FIG. 4 is a schematic block diagram of a method of making a leaf or plate 32 from a folded member 34.

DESCRIPTION OF SOME PREFERRED EMBODIMENTS

Figure 1:
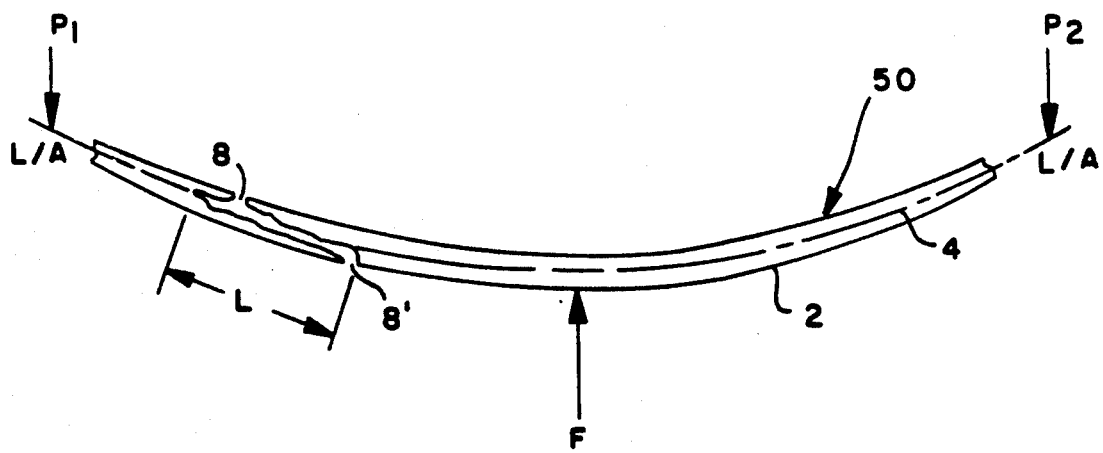
FIG. 1 is a side view of a vehicle suspension leaf spring 50 showing the redirected crack propagation.

Leaf spring 50 in FIG. 1 comprises singular leaf or plate 2 that extends between opposite ends thereof (not shown) that are adapted such as by being formed into eyelets to secure plate 2 to a vehicle frame. Commonly, only one plate in a stacked plurality of spring leaf plates need have eyelets at one or both its opposite ends. In some instances it may be preferable to omit eyelets. Although shown in FIG. 1 as tapering in a direction towards its opposite ends to provide the thickest section at its center, plate 2 may also have a substantially constant thickness throughout its entire length as previously described and well known to those skilled in leaf spring art.

As earlier described, plate 2 may be just one of a plurality of stacked leafs or plates that are secured together to provide the suspension system for a vehicle.

Plate 2 is commonly made from a suitable spring steel alloy and has a substantially rectangular cross-section and a longitudinal axis "L/A" referenced by numeral 4 that extends therealong between its opposite ends.

For illustrative purposes, repetitive bending loads "P" and "P$_2$" have been respectively applied to opposite ends of plate 2 at the point of securement (not shown) that have created reaction force "F" at the spring seat (commonly bridging the center) which has ultimately caused a crack to occur at the upper tensile surface due to fatigue as denoted by reference numeral 8. But rather than crack completely through plate 2 in a direction generally transverse to axis "L/A", the crack propagation has been directed or diverted for a distance "L" in a direction generally parallel to axis "L/A" and ultimately exits on the bottom side as referenced by numeral 8' because of a discontinuity that was purposely introduced within plate 2 as hereinafter described.

As used herein, the word "discontinuity" means a discontinuity in mechanical properties situated along a single plane or along multiple planes that are disposed in a direction generally parallel to the longitudinal axis but not necessarily continous therealong. In instances where the suspension member is a leaf or plate subject to bending loads, the discontinuity is preferably disposed near the neutral axis of the leaf or plate.

Figure 2:
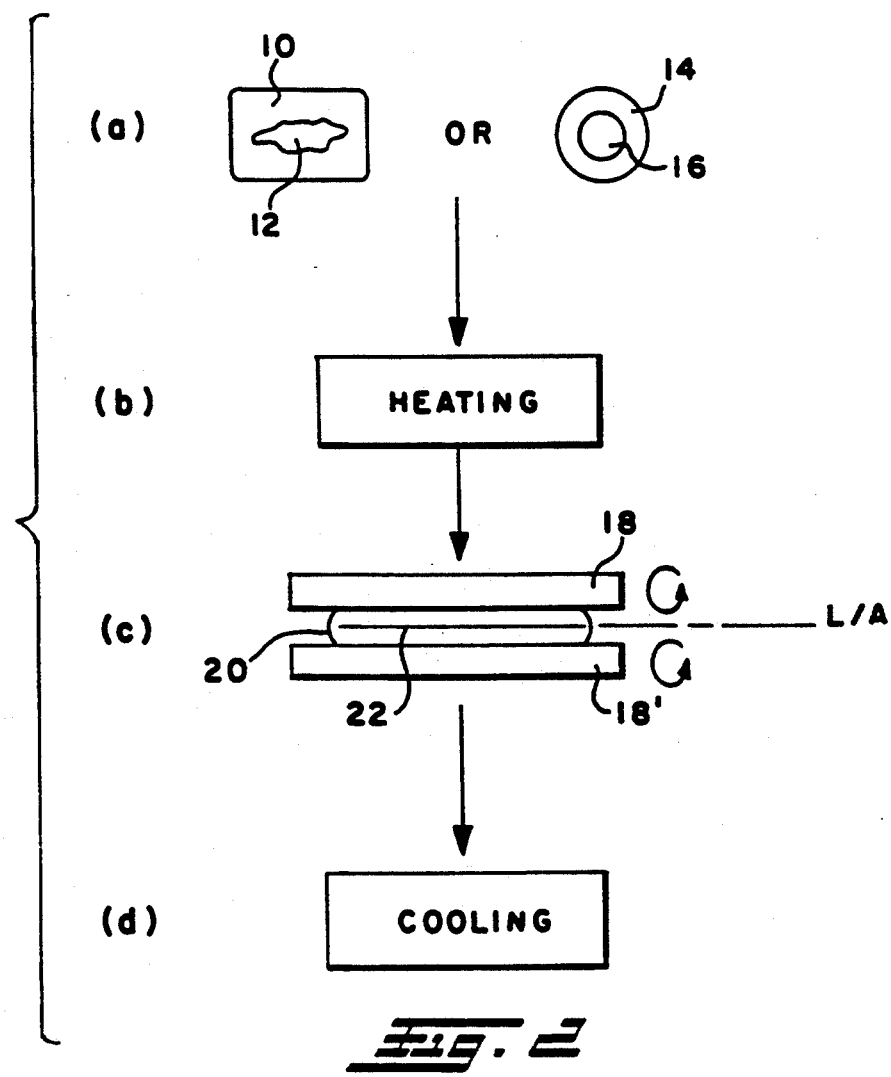
FIG. 2 is a schematic block diagram of a method of making a leaf or plate 22 from a billet 10 having a central void or from a tubular section 14.

One method by which to introduce a discontinuity within the leaf or plate is shown in FIG. 2 where the starting structure is either a billet 10 made from a selected spring steel alloy having a void 12 extending along a central region thereof or a metal tubular section 14 having a void or opening 16 extending centrally therethrough. When made from steel, billet 10 is preferably heated in step (b) to a predetermined temperature such as from about 1700° F. to about 2200° F. and then compressed in step (c) between rollers 18 and 18' or by other suitable compression means into plate 20 so as to compress surfaces surrounding void 12 or void 16 together in a manner effective to form discontinuity 22 that is generally parallel to and in substantial alignment with axis "L/A" and effective to divert or redirect crack propagation in a direction generally parallel thereto. After compression, plate 20 is cooled to ambient temperature in step (d) in instances where it is heated in step (b).

In FIG. 3, a member such as billet 26 made from a selected spring steel metal is provided with plurality of voids 28 therein step (a). As previously described, when made from steel, the member is preferably heated to a predetermined temperature such as from about 1700° F. to about 2200° F. in step (b) and compressed in step (c) into plate 30 between rollers 18 and 18' or other suitable compression means so as to compress surfaces surrounding voids 28 together in a manner effective to form respective discontinuities 32 therebetween that are generally parallel to each other and to axis "L/A" afterwhich plate 30 is cooled to ambient temperature in step (d) in instances where it is heated in step (b). Discontinuities 32 are effective to divert the crack in a direction generally parallel to axis "L/A".

Another method of making vehicle suspension members in accordance with the invention is shown in FIG. 4 where a flat member 34 made from a selected spring steel metal alloy is provided in step (a) and, when made from steel, is preferably heated to a predetermined temperature of about 1700° F: to about 2200° F. in step (b) and folded in step(c) such that it has a generally U shaped cross-sectional configuration having a closed end 35 and an open end 37 after which it is compressed in step (d) between rollers 18 and 18' or other suitable compression means to provide plate 36 with the facing surfaces on opposite sides of the U shaped opening being compressed together in a manner effective to form discontinuity 38 therebetween that is generally parallel to axis "L/A" and effective to divert or redirect crack propagation in a direction generally parallel thereto. Plate 36 is cooled to ambient temperature in step (e), in instances where it is heated in step (b).

Figure 5:
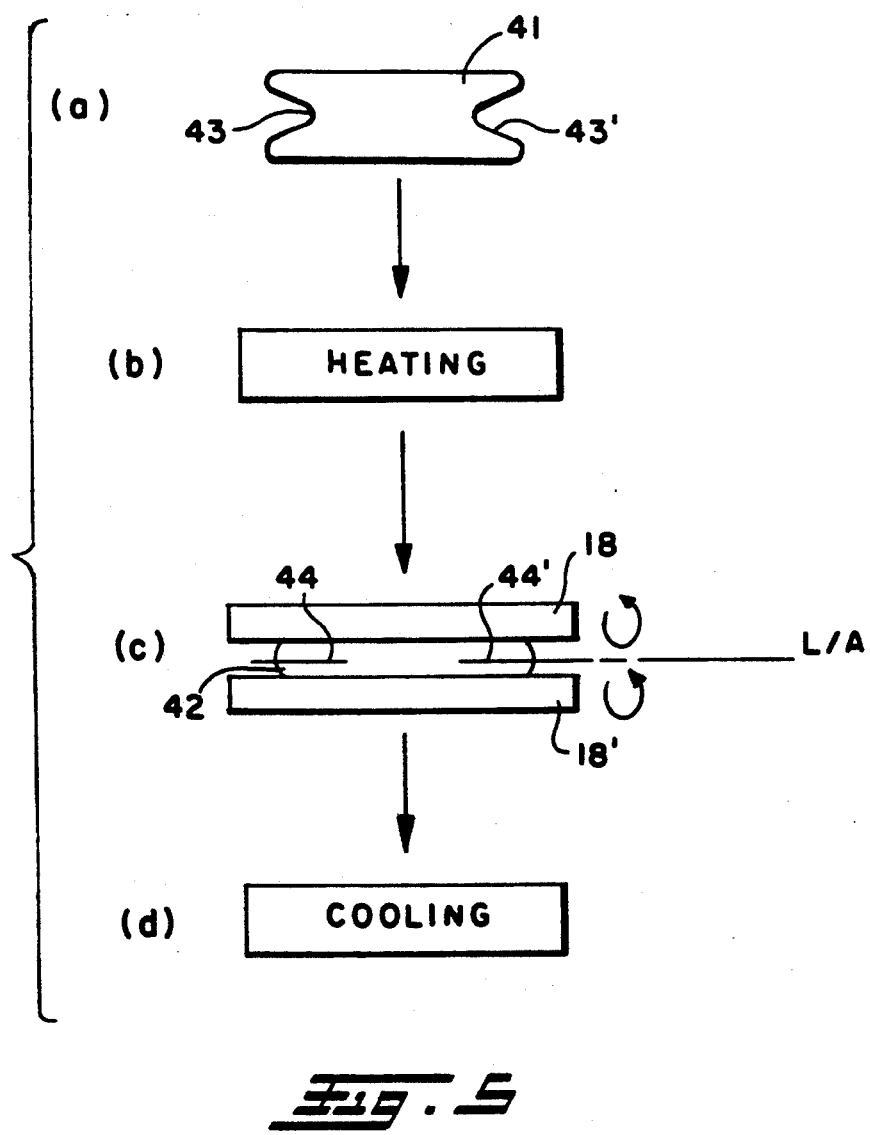
FIG. 5 is a schematic block diagram of a method of making a leaf or plate 42 from a preformed billet member 41 having opposite inwardly concave sidewalls.

Yet another method of making a leaf or plate for a vehicle suspension system in accordance with the invention is shown in FIG. 5 in which a billet 41 or the like is provided in step (a) having opposite sidewalls (43,43') that in cross-section have an inwardly concave configuration created by either casting or by previous rolling history. When made from metal, billet 41 of step (a) is preferably heated to a predetermined temperature in step (b) and then compressed into plate 42 in step (c) between rollers 18 and 18' or other suitable compression means so that the side wall surfaces defining the inwardly concave configurations are compressed together in step (c) in a manner effective to form respective discontinuities 44 and 41' extending along opposite sides thereof that are generally parallel to axis "L/A" and effective to deter crack propagation in a direction generally parallel thereto.

Plate 42 is cooled to ambient temperature in step (d) in instances where it is heated in step (b).

Although shown solely as voids such as voids 12 or 16 in FIG. 2 and voids 28 in FIG. 3 and opening 37 in FIG. 4 and inwardly concave edges 43 and 45' in FIG. 5, it is to be understood that such voids may contain elements such as metal or ceramic fibers to impart the member with desired suspension characteristics.

Thus, the invention provides vehicle suspension members such as leaf springs that are operative to signal impending failure by providing at least one discontinuity therein that is effective to divert or direct crack propagation in a direction generally parallel to longitudinal axis "L/A" extending therealong between opposite ends of the leaf or plate.

What is claimed is:

1. A method of making a vehicle suspension member having a longitudinal axis extending therealong between opposite ends thereof and having at least one discontinuity therein that is disposed in a direction generally parallel to the longitudinal axis and effective to divert crack propagation in a direction generally parallel thereto, said method comprising;
   (a) providing a member having an enclosed void extending along a central region thereof; and
   (b) compressing the member of step (a) so that the surrounding surfaces on opposite sides of the void are compressed together in a manner effective to form the discontinuity therein.

2. The method of claim 1 including the step of heating the member of step (a) prior to step (b).

3. The method of claim 1 wherein the member of step (a) is a tubular section.

4. A method for making a vehicle suspension member having a longitudinal axis extending therealong between opposite ends thereof and having a plurality of discontinuities therewithin that are respectively disposed in a direction generally parallel to each other and to the longitudinal axis and effective to divert crack propagation in a direction generally parallel thereto, said method comprising:
   (a) providing a member having a plurality of enclosed voids disposed along the length thereof; and
   (b) compressing the member of step (a) so that the surfaces surrounding the voids are compressed together in a manner effective to provide the plurality of discontinuities therein.

5. The method of claim 4 including the step of heating the member of step (a) prior to step (b).

6. The method of claim 1 or 4 wherein the member of step (a) is a billet.

7. A method for making a vehicle suspension member having a longitudinal axis extending therealong between opposite ends thereof and having respective discontinuities extending along opposite edges thereof that are disposed in a direction generally parallel to the longitudinal axis and effective to divert crack propagation in a direction generally parallel thereto, said method comprising:

(a) providing an unfolded member having opposite side walls that are configured substantially concave in cross section; and (b) compressing the member of step (a) so that the concave side walls are compressed together in a manner effective to form the respective discontinuities extending along opposite edges of the plate.

8. The method of claim 7 including the step of heating the member of step (a) prior to step (b).

* * * * *